(12) United States Patent
Currid et al.

(10) Patent No.: US 7,971,045 B1
(45) Date of Patent: Jun. 28, 2011

(54) SYSTEM AND METHOD FOR SELECTING A NETWORK BOOT DEVICE USING A HARDWARE CLASS IDENTIFIER

(75) Inventors: Andrew Currid, Alameda, CA (US); Mark A. Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 967 days.

(21) Appl. No.: 11/611,820

(22) Filed: Dec. 15, 2006

(51) Int. Cl.
*G06F 15/173* (2006.01)
(52) U.S. Cl. ............... 713/1; 713/2; 713/100; 709/226
(58) Field of Classification Search .............. 713/1, 2, 713/100; 709/226
See application file for complete search history.

(56) References Cited

U.S. PATENT DOCUMENTS

| 7,363,514 B1* | 4/2008 | Behren ............................. 713/2 |
| 7,506,151 B2* | 3/2009 | Miyamoto et al. ................. 713/2 |
| 2004/0143654 A1* | 7/2004 | Poirot et al. .................. 709/223 |
| 2005/0097360 A1* | 5/2005 | Chu et al. ...................... 713/201 |
| 2005/0283606 A1* | 12/2005 | Williams ....................... 713/166 |
| 2008/0028034 A1* | 1/2008 | Currid et al. .................. 709/217 |
| 2008/0141015 A1* | 6/2008 | Chalemin et al. ................. 713/2 |

* cited by examiner

*Primary Examiner* — Abdelmoniem Elamin
(74) *Attorney, Agent, or Firm* — Patterson & Sheridan, LLP

(57) ABSTRACT

Embodiments of the invention provide a method for selecting a network boot device using a hardware class identifier. Generally, embodiments of the invention enable a diskless client to communicate a hardware class identifier in a network connection request. The hardware class identifier is used to determine the proper boot server to provide a boot image to the diskless client.

23 Claims, 4 Drawing Sheets

| IMAGE | BOOT SERVER | NETWORK ADDRESS | # ACTIVE CONNECTIONS |
|---|---|---|---|
| A | 100 | 102.13.15.6 | 10 |
| A | 120 | 102.13.15.7 | 2 |
| A | 140 | 102.13.15.8 | 3 |
| A | 160 | 102.13.15.9 | 7 |
| A | 180 | 102.13.15.5 | 4 |
| B | 110 | 102.13.17.2 | 5 |
| B | 130 | 102.13.17.4 | 8 |
| B | 150 | 102.13.17.8 | 3 |
| B | 170 | 102.13.17.9 | 12 |
| C | 190 | 102.13.18.1 | 15 |
| C | 200 | 102.13.18.6 | 9 |

FIG. 3

SYSTEM AND METHOD FOR SELECTING A NETWORK BOOT DEVICE USING A HARDWARE CLASS IDENTIFIER

BACKGROUND OF THE INVENTION

1. Field of the Invention

Embodiments of the present invention relate generally to the selection of network boot devices and more specifically to a method for selecting a network boot device using a hardware class identifier.

2. Description of the Related Art

A diskless client is a computing device which, having little or no disk drive capacity, relies on a network connection to a server device to obtain stored data. In certain computing environments, diskless clients can offer cost and management advantages over full-featured computing devices. The diskless computing device becomes a client of a server system, which provides software boot images to the client. The server system includes mass storage, such as one or more hard disks, from which operating system (OS) boot images are served to one or more client devices. This type of server system is hereafter referred to as a boot server. The boot server therefore maintains unique operating system boot images for each unique configuration of hardware represented in the client devices. For example, one client device may include a specific type of graphics controller that uses a specific device driver, while a second client device may include a second type of graphics controller that uses a second type of device driver. In such a case, the boot server maintains at least two unique boot images, one for each of the two unique configurations of hardware, determined by the specific type of graphics controller.

Typically, the diskless client connects to the boot server by using a protocol such as internet Small Computer System Interface (iSCSI), which enables the client to use the boot server as a local boot device. In order to establish this connection, the client requires the network address of the boot server. However, in a situation where there are multiple boot servers providing multiple types of boot images, a determination of the proper boot server for a particular client must be made first. In such a situation, the assignment of a client to a specific boot server may require the manual intervention by a user or administrator, an expensive and error-prone process. Further, a manual process requires that a new client will not be usable until the assignment is completed. Also, to avoid a manual intervention every time the client is booted up, the server assignment may have to be fixed in the configuration of the client (i.e., hard-coded). Thus, the flexibility of the overall system is reduced, since the hard-coding of each client to a server must be updated whenever changes are made to the addresses or contents of the boot servers.

As the foregoing illustrates, there is a need in the art for a more efficient technique for assigning boot image servers to diskless computing devices.

SUMMARY OF THE INVENTION

The present invention generally provides techniques and apparatus for assigning boot image servers to diskless computing devices.

One embodiment provides a method for selecting a network boot device for a client. The method generally includes determining a hardware class identifier of the client device, communicating the hardware class identifier in a network connection request to a management server, determining, at the management server, an appropriate boot device for the client based on the hardware class identifier, communicating the appropriate boot device to the client device in a network connection response, establishing a connection between the client device and the appropriate boot server, and receiving, by the client device, the boot image from the boot server.

Another embodiment provides a computer system configured for automatically selecting a network boot device for a client device. The system generally includes one or more boot servers, one or more diskless clients, and one or more resource assignment servers. The boot servers generally contain one or more boot images to be provided to diskless clients. The diskless clients generally contain a network initiator configured to send a connection request including a hardware class identifier. The resource assignment servers are generally configured to receive a connection request and, in response, assign a boot server to the diskless client that sent the response based on the hardware class identifier contained in the request.

Another embodiment provides a diskless client generally including a processor, an interface to a network, and a computer readable medium containing a boot application. When executed by the processor, the application perform operations generally including sending, via the interface, a network request containing a hardware class identifier, receiving a response to the network request containing an identification of a boot device determined to be appropriate for the boot device based on the hardware class identifier, establishing a connection with the identified boot device, and receiving a boot image from the identified boot device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 illustrates an exemplary look-up table with records of images stored on boot servers.

DETAILED DESCRIPTION

Embodiments of the present invention relate generally to the selection of network boot devices and more specifically to a method for selecting a network boot device using a hardware class identifier.

In certain situations, an organization may beneficially use a client-server computing environment where diskless clients are connected to servers. Typically, a diskless client is booted from a boot image provided by a server. A given boot image is configured for a client comprising a particular set of hardware components. A technique for provisioning a diskless client with the appropriate boot image is described in greater detail in the co-pending application entitled "System and Method for Operating System Installation on a Diskless Computing Platform," filed on Jul. 25, 2006, and having Ser. No. 11/459,850, hereby incorporated by reference in its entirety.

However, a large organization may have a requirement for a large number of clients having various hardware configurations. If the boot images required for the various hardware configurations are stored on multiple servers, the problem of assigning the appropriate server to a client can become complex. As described below, the embodiments of the present invention provide a method to automatically assign the appropriate server to a client.

Figure 1A:
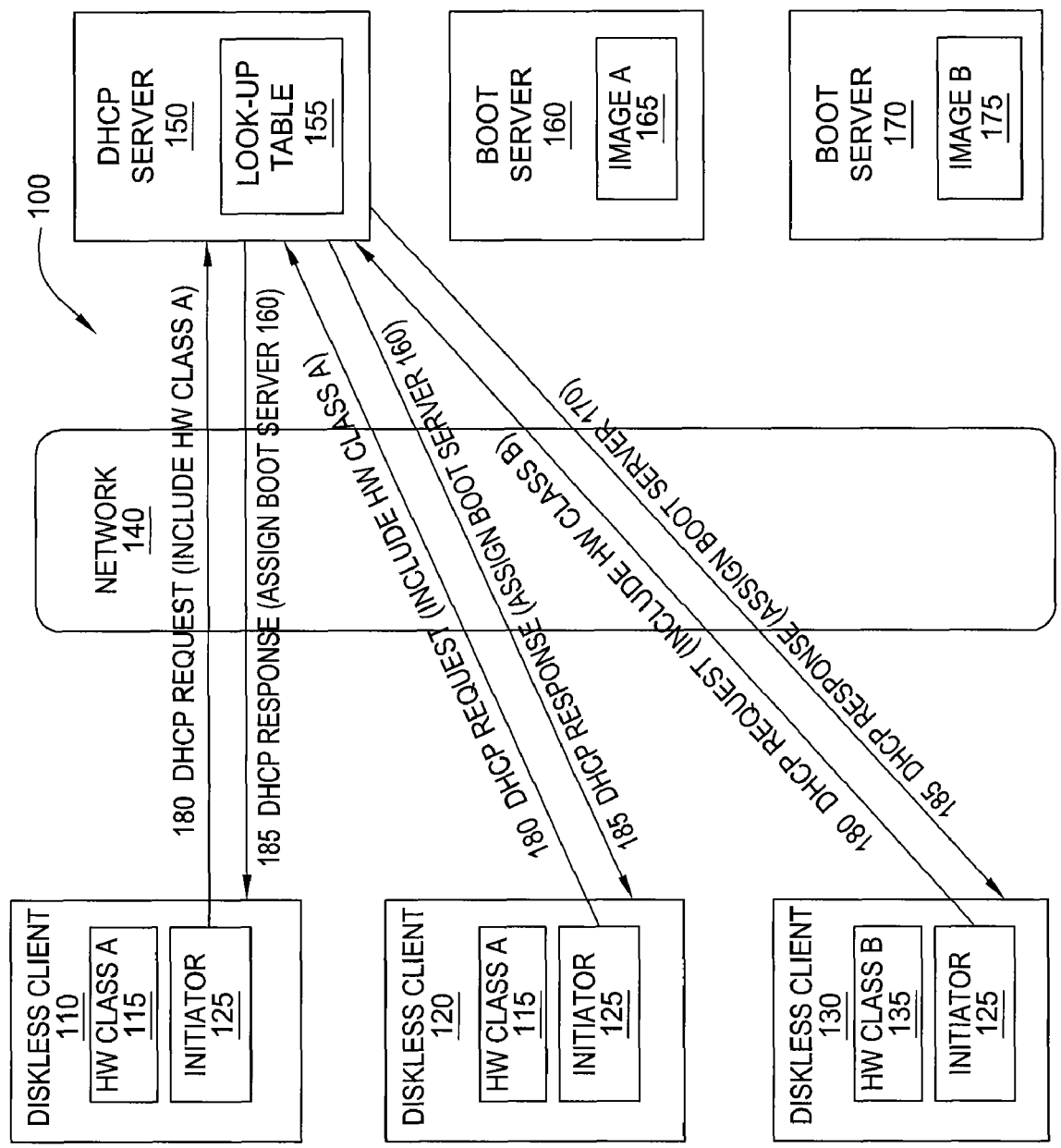
FIGS. 1A-B illustrate an example of selecting a network boot device using a hardware class identifier, according to one embodiment of the invention.
Figure 1B:
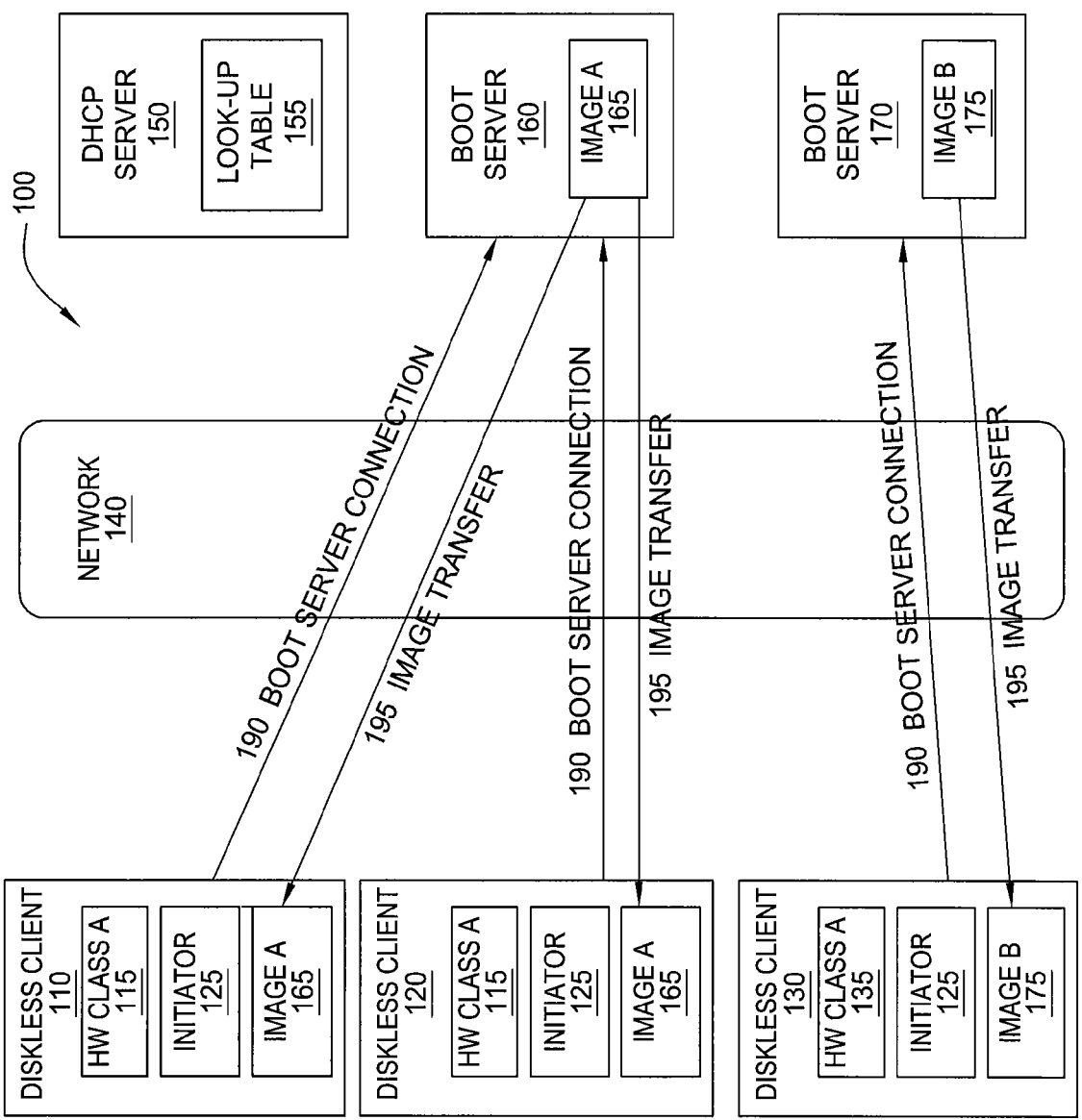

FIGS. 1A-B illustrate an example of selecting a network boot device using a hardware class identifier, according to one embodiment of the invention. FIG. 1A illustrates a conceptual diagram of a client-server system 100 that includes, without limitation, diskless clients 110, 120, 130 connected through network 140 to a Dynamic Host Configuration Protocol (DHCP) server 150, boot server A 160, and boot server B 170. As is known to a person of skill in the art, the present invention is not limited to the DHCP protocol, and could include other resource discovery protocols such as the Service Location Protocol (SLP).

In this embodiment, diskless clients 110 and 120 are configured identically, and thus both can be identified by hardware class identifier A ("HW class A") 115. Diskless client 130 is configured differently from diskless clients 110 and 120, and is identified by hardware class identifier B ("HW class B") 135. The hardware class identifiers 115, 135 may have the important characteristic that an operating system boot image suitable to boot one instance of a diskless client having a given hardware class identifier will boot any other instance of a diskless client having the same hardware class identifier. The generation of the hardware class identifier is described in greater detail in the co-pending application entitled "Method to Accelerate Identification of Hardware Platform Classes," filed on Jul. 25, 2006 and having Ser. No. 11/459,871 hereby incorporated by reference in its entirety.

In this embodiment, the starting (i.e., powering up) of diskless client 110 by a user results in initiator 125 sending a DHCP request 180 into network 140. Initiator 125 includes a copy of hardware class identifier A 115 in a data field of DHCP request 180. DHCP server 150 performs the function of listening to network 140 for any DHCP requests 180. Upon receiving DHCP request 180 from client 110, DHCP server 150 extracts the hardware class identifier A 115 and uses it to retrieve the appropriate boot server address from look-up table 155.

In this embodiment, boot server 160 includes image A 165, which is the software boot image appropriate for clients having hardware class identifier A 115. Further, boot server 170 includes image B 175, which is the software boot image appropriate for clients having hardware class identifier B 135. Thus, the appropriate boot server for client 110, having hardware identifier class A 115, is boot server 160. This assignment is retrieved by DHCP server 150 from look-up table 155, and is sent to client 110 in DHCP response 185.

As shown, the start-up of clients 120 or 130 results in steps of DHCP request 180 and DHCP response 185, similar to the process described above. Client 120 has hardware class identifier A 115, so DHCP server 150 sends DHCP response 185 assigning client 120 to boot server 160. In contrast, client 130 has hardware class identifier B 135, so DHCP server 150 sends DHCP response 185 assigning client 130 to boot server 170.

FIG. 1B illustrates the client-server system 100 of FIG. 1A after the DHCP response 185 has provided client 110 with the assignment of boot server 160. Client 110, now having the proper assignment to boot server 160, establishes a boot image connection 190 to boot server 160. Likewise, client 120 establishes a boot image connection 190 to boot server 160, and client 130 establishes a boot image connection 190 to boot server 170. The boot image connections 190 enable transfer 195 of boot image A 165 to clients 110, 120, and transfer 195 of boot image B 175 to client 130. When transfers 195 are complete, clients 110 and 120 can be booted to boot image A 165, and client 130 can be booted to boot image B 175.

In another embodiment of the present invention, the boot servers may be virtual servers located in one or more physical servers.

In yet another embodiment, since the DHCP server receives all DHCP requests from clients joining the network, the DHCP server may be configured to automatically construct an inventory of diskless clients that are active on the network, including the hardware class of each client. Further, the DHCP server may, in the course of assigning a boot server to a diskless client, determine the assignment based on desired criteria such as load balancing across boot server, minimization of network latency, etc.

An example of look-up table 155 is illustrated in FIG. 3. As shown, exemplary look-up table 300 comprises records of images 310 stored on boot servers 320, the network address 330 of the boot servers, and the number of active connections 340 on each boot server 320. In this example, unlike the example illustrated in FIG. 1A, there are multiple boot servers 320 for each image 310. The number of active connections 340 on each boot server 320 is maintained in look-up table 300 in order to enable load-balancing across the various boot servers hosting the same boot image.

Figure 2:
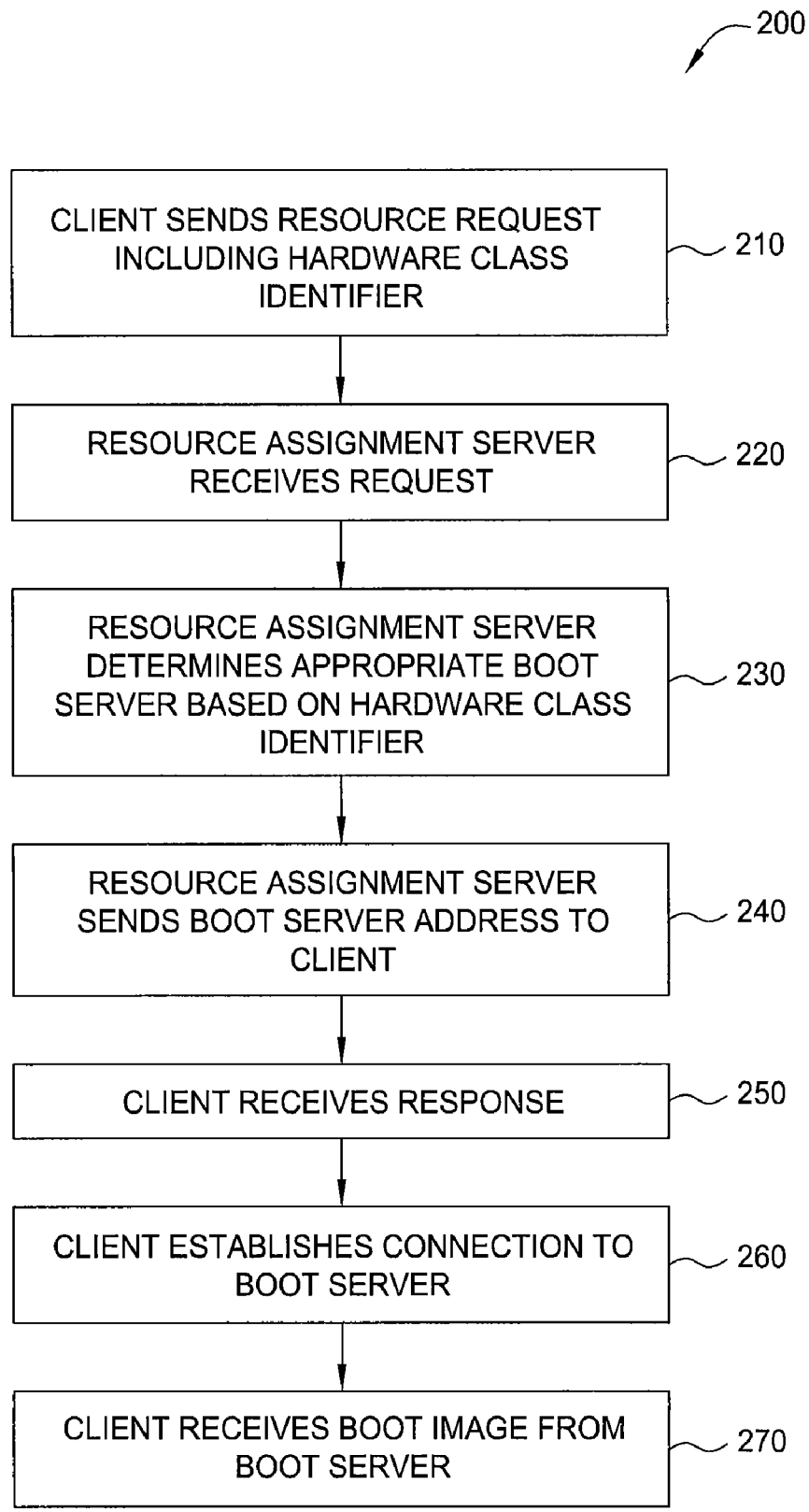
FIG. 2 illustrates a method for selecting a network boot device using a hardware class identifier, according to one embodiment of the invention.

FIG. 2 illustrates a method 200 for selecting a network boot device using a hardware class identifier, according to one embodiment of the invention. In order to explain method 200, the following description includes references in parentheses to the example illustrated in FIGS. 1A-B.

As shown, method 200 begins at step 210, where a diskless client (e.g., client 110 of FIG. 1A) sends a request (DHCP request 180) which includes the hardware class identifier of the client (hardware class identifier 115.) At step 220, a resource assignment server (DHCP server 150) receives the request. At step 230, the resource assignment server determines the appropriate boot server based on the hardware class identifier included in the connection request. At step 240, the resource assignment server sends a reply (DHCP response 185) containing the network address of the assigned boot server (boot server 160.) At step 250, the client receives the response. At step 260, the client establishes a connection (boot image connection 190) to the assigned boot server. At step 270, the client receives a transfer (transfer 195) of the required software boot image (image A 165).

As described, the present invention advantageously enables the booting of diskless clients from multiple boot servers without requiring human intervention. Further, the present invention enhances flexibility in system administration in the event of changes to the configuration of the system. Furthermore, the present invention enables the intelligent managing of resources according to desired criteria, as well as the automatic reporting of network resources.

While the foregoing is directed to embodiments of the present invention, other and further embodiments of the invention may be devised without departing from the basic scope thereof, and the scope thereof is determined by the claims that follow.

What is claimed is:

1. A method for selecting a network boot device for a client, comprising:
   determining a hardware class identifier of the client device;
   communicating the hardware class identifier in a network connection request to a management server;
   determining, at the management server, an appropriate boot device for the client based on the hardware class identifier and a set of criteria;
   communicating the appropriate boot device to the client device in a network connection response;
   establishing a connection between the client device and the appropriate boot server; and
   receiving, by the client device, the boot image from the boot server.

2. The method of claim 1, wherein the hardware class identifier is stored at the client device.

3. The method of claim 1, wherein communicating the hardware class identifier in a network connection comprises:
   transmitting a request to the management server in a Dynamic Host Configuration Protocol (DHCP) or Service Location Protocol (SLP) request.

4. The method of claim 1, wherein establishing a connection to the appropriate boot server is performed according to the internet Small Computer System Interface (iSCSI) data protocol.

5. The method of claim 1, wherein the determination of the appropriate boot server based on the hardware class identifier is performed on a resource assignment server.

6. The method of claim 1, wherein the set of criteria includes at least one of load balancing and network latency.

7. The method of claim 5, wherein the resource assignment server monitors network connection requests to automatically build a report of the inventory of the clients on the network, including the hardware class of the clients.

8. A computer system configured for automatically selecting a network boot device for a client device, comprising:
   one or more boot servers, each containing one or more boot images to be provided to diskless clients;
   one or more diskless clients containing a network initiator configured to send a connection request including a hardware class identifier; and
   one or more resource assignment servers configured to receive a connection request and, in response, assign a boot server to the diskless client that sent the connection request based on the hardware class identifier contained in the request and set of criteria.

9. The computer system of claim 8, wherein the one or more resource assignment servers assigns boot servers to diskless clients based on a lookup table.

10. The computer system of claim 9, wherein the lookup table comprises entries that indicate which boot images for different hardware classes are on which boot servers.

11. The computer system of claim 10, wherein the lookup table comprises network addresses for the boot servers.

12. The computer system of claim 8, wherein the set of criteria includes at least one of load balancing and network latency.

13. The computer system of claim 8, wherein the resource assignment servers are Dynamic Host Configuration Protocol (DHCP) or Service Location Protocol (SLP) compatible servers and the connection request is sent in a DHCP or SLP request.

14. The computer system of claim 8, wherein the one or more resource assignment servers are configured to automatically build an inventory of the diskless clients on the network.

15. The computer system of claim 14, wherein the inventory includes hardware class of the clients.

16. A diskless client, comprising:
   a processor;
   an interface to a network; and
   a computer readable medium containing a boot application which, when executed by the processor performs operations, comprising:
      sending, via the interface, a network request containing a hardware class identifier,
      receiving a response to the network request containing an identification of a boot device determined to be appropriate for the boot device based on the hardware class identifier and a set of criteria,
      establishing a connection with the identified boot device, and
      receiving a boot image from the identified boot device.

17. The diskless client of claim 16, wherein the set of criteria includes at lease one of load balancing and network latency.

18. The diskless client of claim 16, wherein the network request is sent via at least one of a Dynamic Host Configuration Protocol (DHCP) or a Service Location Protocol (SLP) request.

19. The diskless client of claim 16, wherein the diskless client connects to the boot device via an internet Small Computer System Interface (iSCSI) data protocol connection.

20. The diskless client of claim 16, wherein the diskless client connects to the boot device via a universal serial bus (USB) data protocol connection.

21. The method of claim 1, wherein the network connection response includes a network address associated with the appropriate boot device.

22. The computer system of claim 8, wherein the boot server is assigned to the diskless client by transmitting a network connection response to the diskless client that includes a network address associated with the boot server.

23. The diskless client of claim 16, wherein the response to the network request includes a network address that identifies the boot device.

* * * * *